United States Patent
Brockners et al.

(10) Patent No.: US 7,843,917 B2
(45) Date of Patent: Nov. 30, 2010

(54) HALF-DUPLEX MULTICAST DISTRIBUTION TREE CONSTRUCTION

(75) Inventors: Frank Brockners, San Francisco, CA (US); Ali Sajassi, San Ramon, CA (US); Robert James Goguen, Acton, MA (US); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 11/983,678

(22) Filed: Nov. 8, 2007

(65) Prior Publication Data

US 2009/0122732 A1   May 14, 2009

(51) Int. Cl.
*H04L 12/28* (2006.01)
(52) U.S. Cl. .................. 370/389; 370/276; 370/400
(58) Field of Classification Search .................. None
See application file for complete search history.

(56) References Cited

U.S. PATENT DOCUMENTS

| | | | |
|---|---|---|---|
| 5,818,842 A | 10/1998 | Burwell et al. |
| 5,848,227 A | 12/1998 | Sheu |
| 6,055,364 A | 4/2000 | Speakman et al. |
| 6,078,590 A | 6/2000 | Farinacci et al. |
| 6,188,694 B1 | 2/2001 | Fine et al. |
| 6,304,575 B1 | 10/2001 | Carroll et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |

(Continued)

OTHER PUBLICATIONS

Lahti "Quality of Service in the Poin-to-Point Protocol over Ethernet" in: Google Scholar (on line,.

(Continued)

*Primary Examiner*—Bob A Phunkulh
(74) *Attorney, Agent, or Firm*—The Law Offices of Bradley J. Bereznak

(57) ABSTRACT

In one embodiment, a method includes sending upstream to a nearest neighbor node, by a Client Label Switched Router (LSR), a downstream label map message of a Server-Forwarding Equivalence Class type (S-FEC-DOWN). In response to the S-FEC-DOWN, a downstream forwarding state from the nearest neighbor node to the Client LSR is established. An upstream label map message of a Client-Forwarding Equivalence Class type (C-FEC UP) is received from the nearest neighbor node. An upstream forwarding state corresponding to the C-FEC UP is then established by the Client LSR.

23 Claims, 12 Drawing Sheets

U.S. PATENT DOCUMENTS

| | | | |
|---|---|---|---|
| 6,829,252 B1 | 12/2004 | Lewin et al. | |
| 6,839,348 B2 | 1/2005 | Tang et al. | |
| 6,850,521 B1 | 2/2005 | Kadambi et al. | |
| 6,850,542 B2 | 2/2005 | Tzeng | |
| 6,852,542 B2 | 2/2005 | Mandel et al. | |
| 6,879,594 B1 * | 4/2005 | Lee et al. | 370/408 |
| 6,892,309 B2 | 5/2005 | Richmond et al. | |
| 7,009,983 B2 | 3/2006 | Mancour | |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,668,116 B2 * | 2/2010 | Wijnands et al. | 370/254 |
| 2002/0196795 A1 | 12/2002 | Higashiyama | |
| 2003/0110268 A1 | 6/2003 | Kermarec et al. | |
| 2003/0142674 A1 | 7/2003 | Casey | |
| 2003/0177221 A1 | 9/2003 | Ould-Brahim et al. | |
| 2004/0095940 A1 | 5/2004 | Yuan et al. | |
| 2004/0125805 A1 * | 7/2004 | De Clercq et al. | 370/395.5 |
| 2004/0125809 A1 | 7/2004 | Jeng | |
| 2004/0133700 A1 * | 7/2004 | De Clercq et al. | 709/242 |
| 2004/0158735 A1 | 8/2004 | Roese | |
| 2004/0165525 A1 | 8/2004 | Burak | |
| 2004/0165600 A1 | 8/2004 | Lee | |
| 2004/0264364 A1 | 12/2004 | Sato | |
| 2005/0007951 A1 | 1/2005 | Lapuh et al. | |
| 2005/0030975 A1 | 2/2005 | Wright et al. | |
| 2005/0063397 A1 | 3/2005 | Wu et al. | |
| 2005/0099949 A1 | 5/2005 | Mohan et al. | |
| 2005/0163049 A1 | 7/2005 | Yazaki et al. | |
| 2006/0182037 A1 | 8/2006 | Chen et al. | |
| 2009/0010272 A1 * | 1/2009 | Wijnands et al. | 370/408 |

OTHER PUBLICATIONS

<URL:http://www.e.kth.se/~e95_pla/exjobb/doc/Lahti_Thesis_QoS_in_PPPoE.pdf>) Oct. 1, 2000.

* cited by examiner

US 7,843,917 B2

HALF-DUPLEX MULTICAST DISTRIBUTION TREE CONSTRUCTION

TECHNICAL FIELD

This disclosure relates generally to the field of transport of data packets over a digital network.

BACKGROUND

The Internet Protocol (IP) is the communication protocol used throughout the Internet for directing data packets. All data packet traffic needs to have IP address information for the routers to steer it to the correct destination. Multi-Protocol Label Switching (MPLS) is an alternate scheme to control the forwarding—with labels determining how a packet is forwarded. IP and MPLS are often used in a complementary manner, e.g., to deliver virtual private network services, traffic engineering, etc. Routers on the incoming edge of the MPLS network add information (i.e., an MPLS "label") about a specific path the packet is taking en route to its destination to the top of each packet. This label is based on some criteria (e.g., destination IP address) and is then used to steer the packet through the subsequent routers. An MPLS network thus obviates the need for each router to look up the IP address of the next node in the path.

Service Providers (SPs) are increasingly deploying MPLS in their access and aggregation networks. Many SPs also want to offer wholesale services, including multicast services such as broadcast TV at Layer 2 over MPLS. A multicast wholesale service at Layer 2 usually requires the SP to transport multicast traffic from a few sources ("Servers") to many receivers ("Clients"). In this scenario, Servers need to be able to communicate with each other and with all Clients. Clients should also be able to communicate with the sources (e.g. to request a new multicast channel). But Clients should not be able to communicate with each other to avoid security issues. Unfortunately, achieving this result in an efficient transport mechanism without scaling problems, and which does not require manual configuration of distribution trees, has been difficult.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

Figure 1:
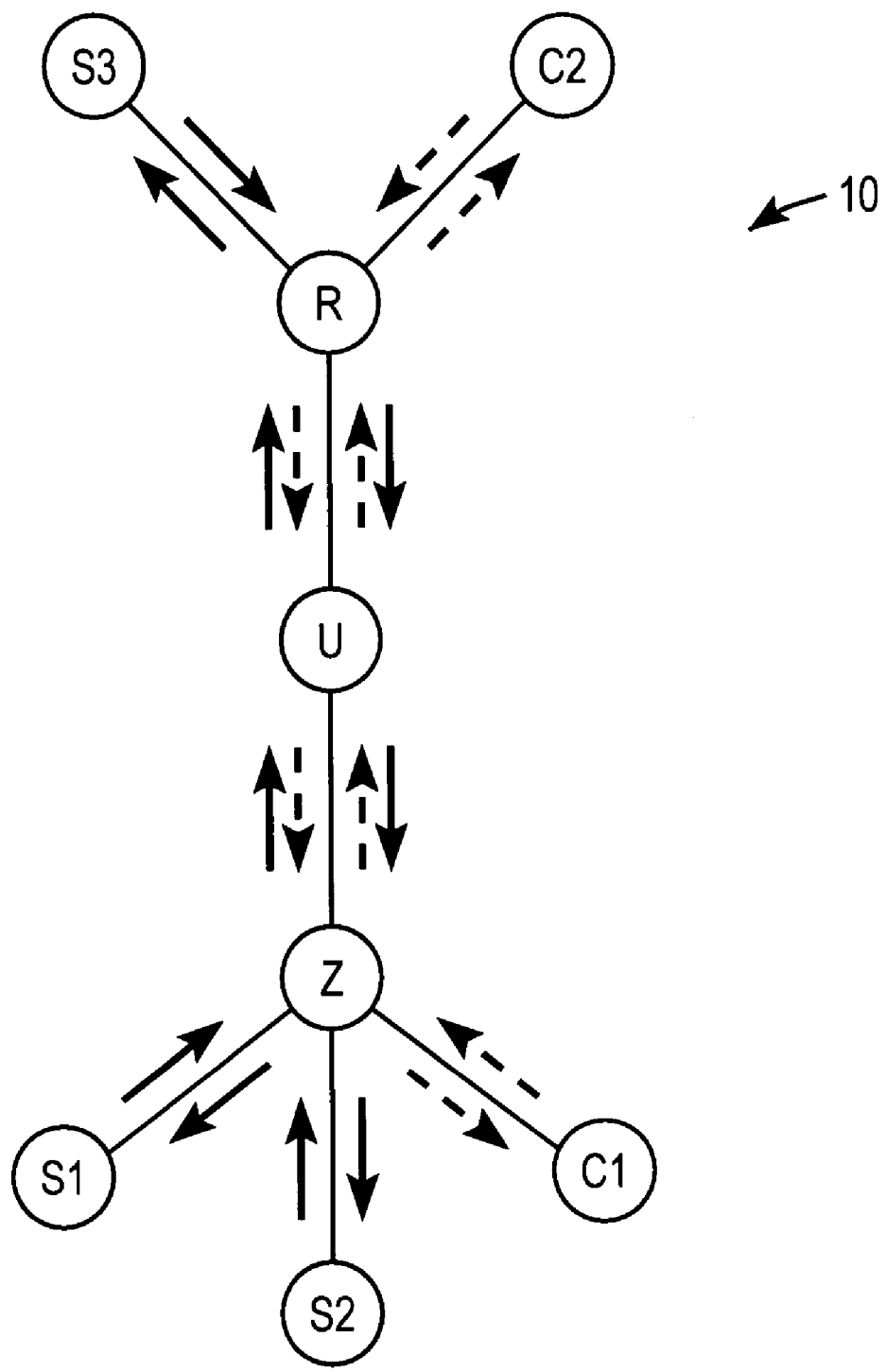
FIG. 1 illustrates an example Half-Duplex Multipoint-to-Multipoint (HD-MP2MP) distribution tree built as a collection of label states.

In one embodiment, a method comprises sending upstream to a nearest neighbor node, by a Client Label Switched Router (LSR), a downstream label map message of a Server-Forwarding Equivalence Class type (S-FEC-DOWN). In response, a downstream forwarding state from the nearest neighbor node to the Client LSR is established. Responsive to receiving an upstream label map message of a Client-Forwarding Equivalence Class type (C-FEC UP) from the nearest neighbor node, the Client LSR establishes an upstream forwarding state corresponding to the C-FEC UP.

In another embodiment, a method comprises sending upstream to a nearest neighbor node, by a Server Label Switched Router (LSR), a downstream label map message of a Client-Forwarding Equivalence Class type (C-FEC DOWN). In response, a downstream forwarding state from the nearest neighbor node to the Server LSR is established by the nearest neighbor node. Responsive to receiving an upstream label map message of a Server-Forwarding Equivalence Class type (S-FEC UP) from the nearest neighbor node, the Server LSR establishes an upstream forwarding state corresponding to the S-FEC UP.

In yet another embodiment, a method comprises sending an upstream label map message of a Server-Forwarding Equivalence Class type (S-FEC UP) to a Server responsive to receiving a downstream label map message of a Client-Forwarding Equivalence Class type (C-FEC DOWN) from the Server. Responsive to receiving a downstream label map message of a Server-Forwarding Equivalence Class type (S-FEC DOWN) from a Client, an upstream label map message of a Client-Forwarding Equivalence Class type (C-FEC UP) is set to the Client.

In still another embodiment, an apparatus comprises an interface that connects to a nearest neighbor node via an upstream path of a Multi-Protocol Label Switching (MPLS) network. The apparatus further comprises a means for sending upstream to the nearest neighbor node via the interface, a downstream label map message of a Client-Forwarding Equivalence Class type (C-FEC-DOWN), responsive thereto, a downstream forwarding state from the nearest neighbor node to the apparatus being established. The means being further for receiving an upstream label map message of a Server-Forwarding Equivalence Class type (S-FEC UP) from the nearest neighbor node via the interface, and for establishing an upstream forwarding state from the apparatus to the nearest neighbor node, the upstream forwarding state corresponding to the S-FEC UP.

In yet another embodiment, an apparatus comprises one or more processors and a memory comprising one or more instructions executable at the processors. The one or more processors are operable, when executing the instructions, to receive a downstream label map message of a Client-Forwarding Equivalence Class type (C-FEC DOWN) from a Server LSR of a Multi-Protocol Label Switching (MPLS) network, and send an upstream label map message of a Server-Forwarding Equivalence Class type (S-FEC UP) to the Server responsive to the C-FEC DOWN. The processors being further operable, when executing the instructions, to receive a downstream label map message of a Server-Forwarding Equivalence Class type (S-FEC DOWN) from a Client LSR of the MPLS network, and send an upstream label map message of a Client-Forwarding Equivalence Class type (C-FEC UP) to the Client responsive to the S-FEC DOWN.

In still another embodiment, a method comprises automatically constructing a Half-Duplex Multipoint Distribution Tree (HD-MDT) for transport of video packets from a plurality of servers of a broadcast content provider to a plurality of Digital Subscriber Line Access Multiplexers (DSLAMs) such that each of the servers are operable to forward video packets to all of the DSLAMs and to other ones of the servers, and each of the DSLAMs are operable to forward data packets to the servers, but none of the DSLAMs are operable to forward data packets to any other one of the DSLAMs. The constructing includes receiving, by a node of the HD-MDT, a downstream label map message of a Client-Forwarding Equivalence Class type (C-FEC DOWN) from a first one of the servers. The constructing further includes sending, by the node, an upstream label map message of a Server-Forwarding Equivalence Class type (S-FEC UP) to the first one of the servers responsive to the C-FEC DOWN.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In a normally routed environment, frames pass from a source to a destination in a hop-by-hop basis, wherein transit routers evaluate each frame's header and perform a route table lookup to determine the next hop toward the destination. A Label Switch Router (LSR), as that term is used in the present disclosure, refers to a device such as a switch or router that forwards labeled entities (e.g., data packets) over an MPLS network based upon a label value. The label contains pre-established forwarding information that instructs each LSR in the transit path where to forward data packets. A "label" is a header created by a provider edge device (e.g., a leaf LSR) and is used by LSRs to forward packets. A Label-Switched Path (LSP) refers to a path defined by the labels through LSRs between edge or leaf nodes. A leaf LSR refers to a LSR that terminates the distribution chain over an MPLS network. Examples of leaf LSRs include source nodes (i.e., Servers) and destination nodes (i.e., Clients). A Label Distribution Protocol (LDP) is any version of the LDP specification RFC 2036 that defines a set of messages used to distribute label information among LSRs.

A point-to-multipoint (P2MP) connection in a network is one that provides a path from one location (e.g., a source or root node) to multiple destination nodes. A P2P LSP is an LSP that has a single ingress LSR and a single egress LSR. In contrast, a P2MP LSP is an LSP that has a single ingress LSR and one or more egress LSRs. In other words, a P2MP LSP is a path rooted at one point, wherein every datagram that is inserted at this point is transported to every single egress leaf node. The ingress LSR which acts as the source of a P2MP LSP is commonly referred to as a "root" node.

A multipoint-to-point LSP is simply the reverse; namely, many Clients peering with a single Server, with a single forwarding construct set up to reach the single Server.

A multipoint-to-multipoint LSP is an LSP that connects a set of leaf nodes, acting indifferently as ingress or egress. A Half-Duplex Multipoint to Multipoint (HD-MP2MP) LSP is similar to a P2MP LSP in that it consists of a single root node (typically not a server node), zero or more transit nodes, and one or more leaf LSRs acting equally as ingress or egress LSR. In the context of the present disclosure, a Half-Duplex Multicast Distribution Tree (HD-MP2MP) leverages two or more LSPs, resulting in a distribution tree wherein all Servers forward data packets to all Clients and to other Servers. (Servers connect bi-directionally, whereas Clients connect only unidirectionally as "receive-only" leafs, in a restricted manner.) Additionally, all Clients forward data packets to Servers. (Clients connect only unidirectionally as "send-only" leafs; Servers connect unidirectionally as receive-only leafs.)

In one embodiment, a mechanism is provided for automatically constructing Half-Duplex Multipoint-to-Multipoint LSPs (HD-MP2MP LSPs) over an MPLS infrastructure using an extended version of the Label Distribution Protocol (LDP) between a set of Clients and Servers. The set of users who may leverage this transport construct is divided into two non-overlapping sets: Client (Client LSRs) and Servers (Server LSRs). Servers can communicate with each other and with the clients, i.e. Servers can send data to each other as well as to Clients and can receive data from reach other as well as from Clients. Clients can communicate with servers, i.e. Clients can send data to Servers and can receive data from Servers. But Clients cannot send data to other Clients, nor can they receive data from other Clients. All data is transported as broadcast; that is, any data sent by a Server is received by all other Servers and all Clients. Any data sent by a Client is received by all Servers. Segmenting the set of devices into Clients and Servers is derived from the overall system architecture and may be statically configured. For a multicast wholesale deployment, all residential users of an SP are Clients whereas the multicast content injection points are considered the Servers.

In one embodiment, the disclosed communication mechanism for constructing LSRs over MPLS using an extended version of LDP obviates manual configuration of Clients into "Split-Horizon Groups" since Half-Duplex distribution trees are set up automatically. Tree building is optimized due to the fact that Client and Server distribution trees are built concurrently: An upstream label map message triggers a downstream label map message, thus avoiding additional signaling to establish the LSP. In addition, implementations are highly scaleable since the tree building mechanism does not require P2P connections from Clients to Servers. Scaling issues with respect to the number of connections at the Server are also avoided. The mechanism of the present disclosure thus provides Service Providers who deploy MPLS-based access and aggregation networks for residential subscriber aggregation, and who are required to supply a wholesale multipoint service (e.g., broadcast television) at Layer-2 to other ISPs, with a scalable, efficient and easy-to-maintain multicast wholesale transport vehicle.

In one embodiment, the foregoing communication behavior with restricted connectivity between Clients is achieved through a combination of LDP P2MP LSPs and LDP MP2P LSPs: One P2MP LSP per Server (with the Server forming the root of the P2MP LSP and the clients' other servers forming the leaves) may be established for Server-to-Client communication and also Server-to-Server communication. One MP2P LSP per Server (the Server forming the root of the MP2P tree) may be used to enable Clients and other Servers to communicate with the Server forming the root. As a result, each Client is connected to N P2MP LSPs and N MP2P LSPs, with N being an integer (greater than one) representing the number of Servers In accordance with one embodiment, four P2MP Forwarding Equivalence Class (FEC) types are created to differentiate the origin of the traffic (Client or Server), as well as the two different directions. The four FECs are: Client-Upstream (C-FEC-UP), Client-Downstream (C-FEC-DOWN), Server-Upstream (S-FEC-UP), and Server-Downstream (S-FEC-DOWN). Half-Duplex Multipoint tree construction is achieved through the use of these four FEC types.

FIG. 1 illustrates an example HD-MP2MP distribution tree 10 built as a collection of label states. Nodes are shown as circles, with the letter in the circle identifying the node type. FIG. 1 shows a single root node (R), two Clients (C1 & C2), three Servers (S1, S2 and S3), and a pair of interim or transit nodes (U & Z). In the embodiment shown, construction of tree 10 is leaf initiated; that is, Server and Client operations are sent toward the Root LSR. Each arrow respectively denotes either the upstream or downstream forwarding state between the various nodes.

It is appreciated that each network node includes software (or firmware) plug-ins, modules, or enhancements that implement the various steps taken to and functions performed to form the distribution tree, as described in more detail below.

Figure 2A:
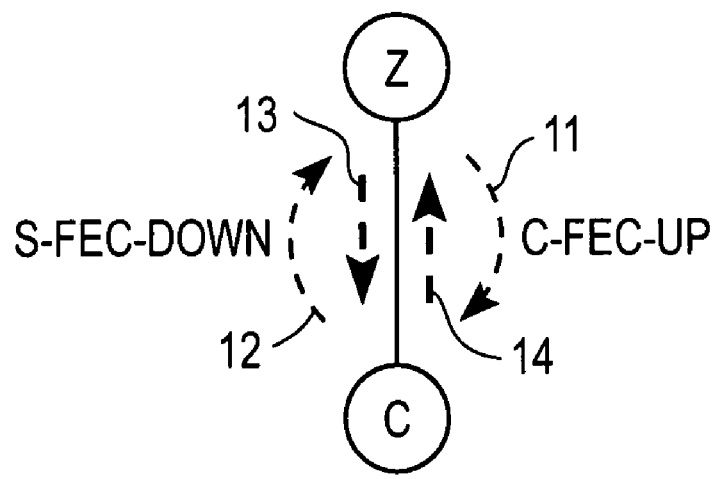
FIG. 2A illustrates an example method of operation for a Client Label Switching Router (LSR).

FIG. 2A illustrates an example method of operation for a Client LSR, such as C1 in FIG. 1. In this example, a Client label switch router is joining the distribution tree. To do so, a downstream label map message (i.e., S-FEC-DOWN) is first sent upstream (i.e., toward the root) from the Client to the next transit node. In this example the next transit node is the upstream neighbor node Z. The sending of the S-FEC-DOWN label map message is represented by dashed line 12. This results in the creation of the forwarding state on Z for S-FEC-DOWN, which is shown by the heavy dashed line 13 from Z to C. Node Z not only creates a forwarding state, but also replies with another upstream label map message (i.e., C-FEC UP) for Client forwarding upstream. The C-FEC-UP label map message is represented by arrow 11. This triggers node C to set up the corresponding upstream forwarding state, which is shown by the heavy dashed arrow 14. In other words, upstream and downstream forwarding paths are set up jointly using label map messages.

It is appreciated that node Z (and each node in the LSP) performs a similar operation further upstream until the forwarding state path is established all the way to the root node. (This assumes that node Z does not yet have the corresponding forwarding state.) It is further appreciated that each of the Clients performs the same operations described above. This provides exactly one path toward every single Client. Note that in the case where there are multiple Clients attached to node Z, node Z only performs the Join or forwarding state creation operation toward the root once, not multiple times, handling the replication locally.

Figure 2B:
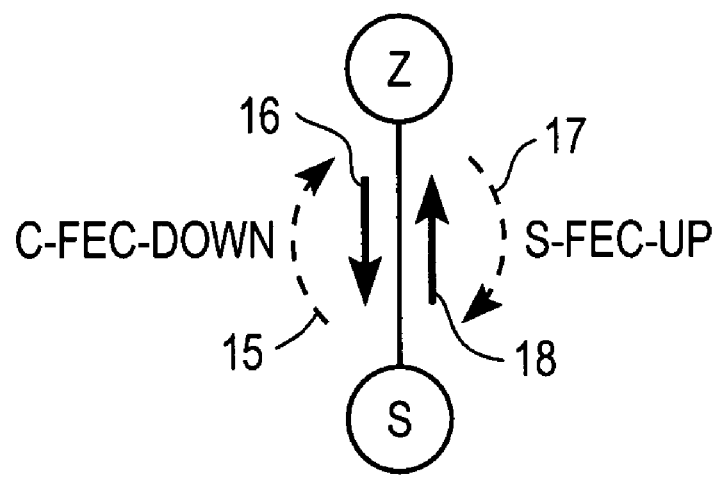
FIG. 2B illustrates an example method of operation for a Server LSR.

FIG. 2B illustrates an example method of operation for a Server LSR, such as S1 in FIG. 1. In this example, when a Server wants to join the distribution tree, it first sends a label map message for C-FEC-DOWN (dashed line 15) to its upstream neighbor (toward R), which, in this example, is node Z. Node Z then creates the downstream forwarding state, which is heavy solid arrow 16 in FIG. 2B. Node Z also replies with another label map message for S-FEC-UP, which is represented by dashed line 17 from Z to S. In response, Server S creates the forwarding state upstream, as shown by heavy solid arrow 18. All servers perform these same operations toward the root.

Figure 3:
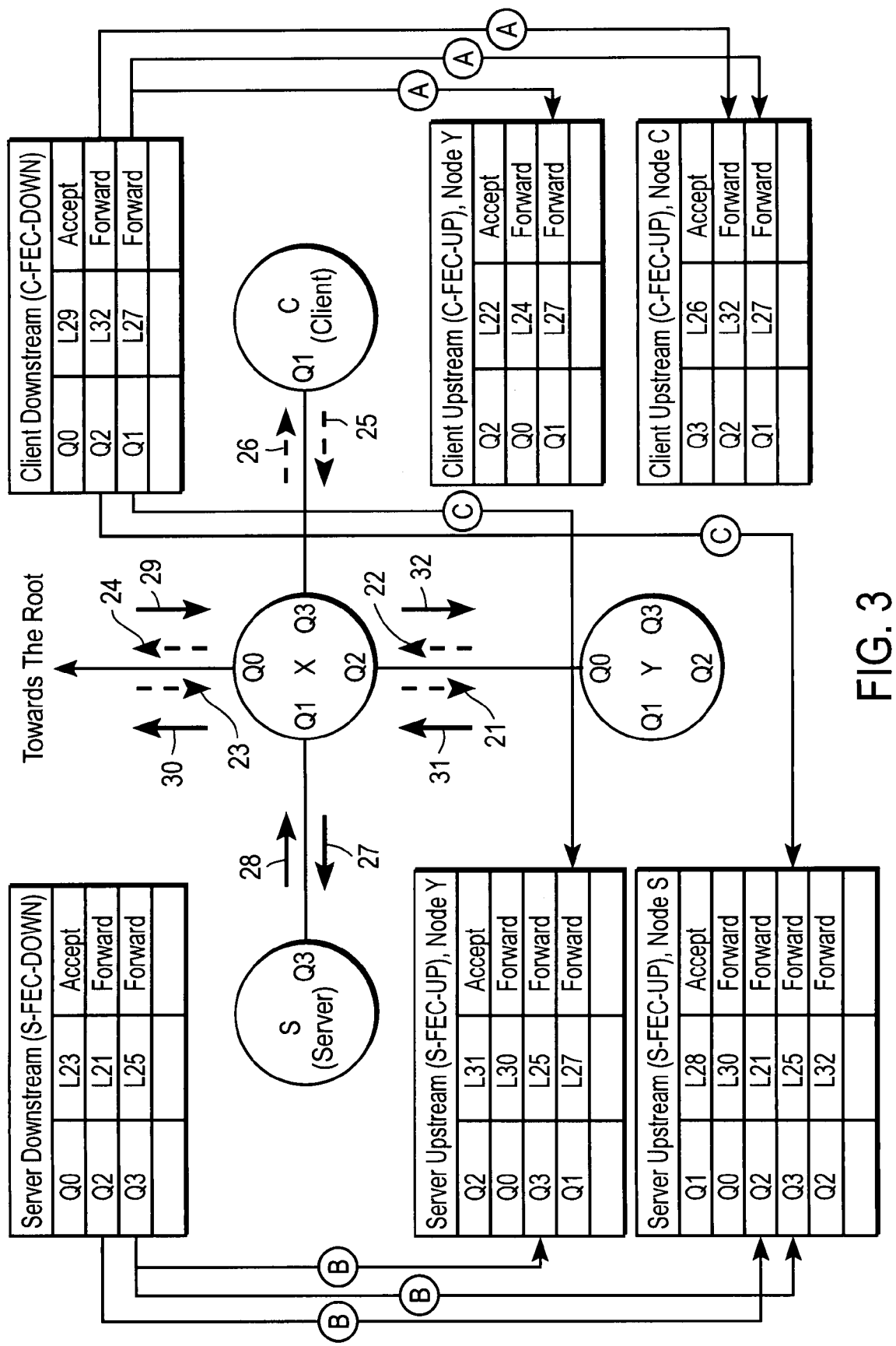
FIG. 3 illustrates an example method of building forwarding/replication state at a transit LSR.

FIG. 3 illustrates an example method of building forwarding/replication state at a transit LSR, which is labeled node X. In this scenario there is a Server S and a Client C connected to transit node X. Also connected to transit node X is another transit node Y. Each of the interfaces for the respective nodes is denoted by the letter "Q". In order to ensure that the traffic from the Server does not first go all the way up to the root on the upstream path, only to come back down again to end up at the Client, a merge operation is performed on node X during construction of the distribution tree. In other words, if Server S sends data packets to all Clients via arrow 28, node X merges the path information smartly so that Client C immediately receives the packets via arrow 26.

To create replication forwarding state in a transit LSR, three main rules are applied during the construction of the distribution tree. (In the example of FIG. 3 the encircled letters "A", "B" and "C" indicate which rule was applied to create forwarding/replication state. The label names, e.g., L29, L32, etc., denote the particular LSP corresponding to the solid and dashed arrows. For instance, L25 corresponds to the LSP shown by dashed arrow 25. First, to ensure that Servers receive traffic from Clients, Rule A mandates that C-FEC-UP copies the replication information from C-FEC-DOWN (except on the interface that traffic is received on). This ensures that traffic from Clients is sent down the tree towards Servers (omitting the interface the traffic is received on). Second, to ensure that Clients receive traffic from Servers, Rule B mandates that S-FEC-UP copies the replication information from S-FEC-DOWN (except on the interface that traffic is received on). This rule ensures that traffic from Servers is sent down the tree towards Clients (omitting the interface the traffic is received on). Lastly, to ensure that Servers receive traffic from Servers, Rule C requires that S-FEC-UP copies the replication information from C-FEC-DOWN (except on the interface that traffic is received on). This ensures that traffic from Servers is sent down the tree towards Servers (again, omitting the interface the traffic is received on).

Stated differently, when a transit node receives S-FEC-DOWN label map, it responds by sending C-FEC-UP label map to the originator of the S-FEC-DOWN label map message. After determining its upstream neighbor, the transit node performs a check of the forwarding state for S-FEC-DOWN. If non-existent, it sends S-FEC-DOWN label map to its upstream neighbor. Conversely, on receipt of C-FEC-DOWN label map, the transit node sends S-FEC-UP label map to the originator. After determining its upstream neighbor, the transit node performs a check of the forwarding state for C-FEC-DOWN. If non-existent, it sends C-FEC-DOWN label map to its upstream neighbor. In this manner, the transit node X builds forwarding state from the already existing state to ensure that traffic is sent down the tree as shown in FIG. 3.

Figure 4A:
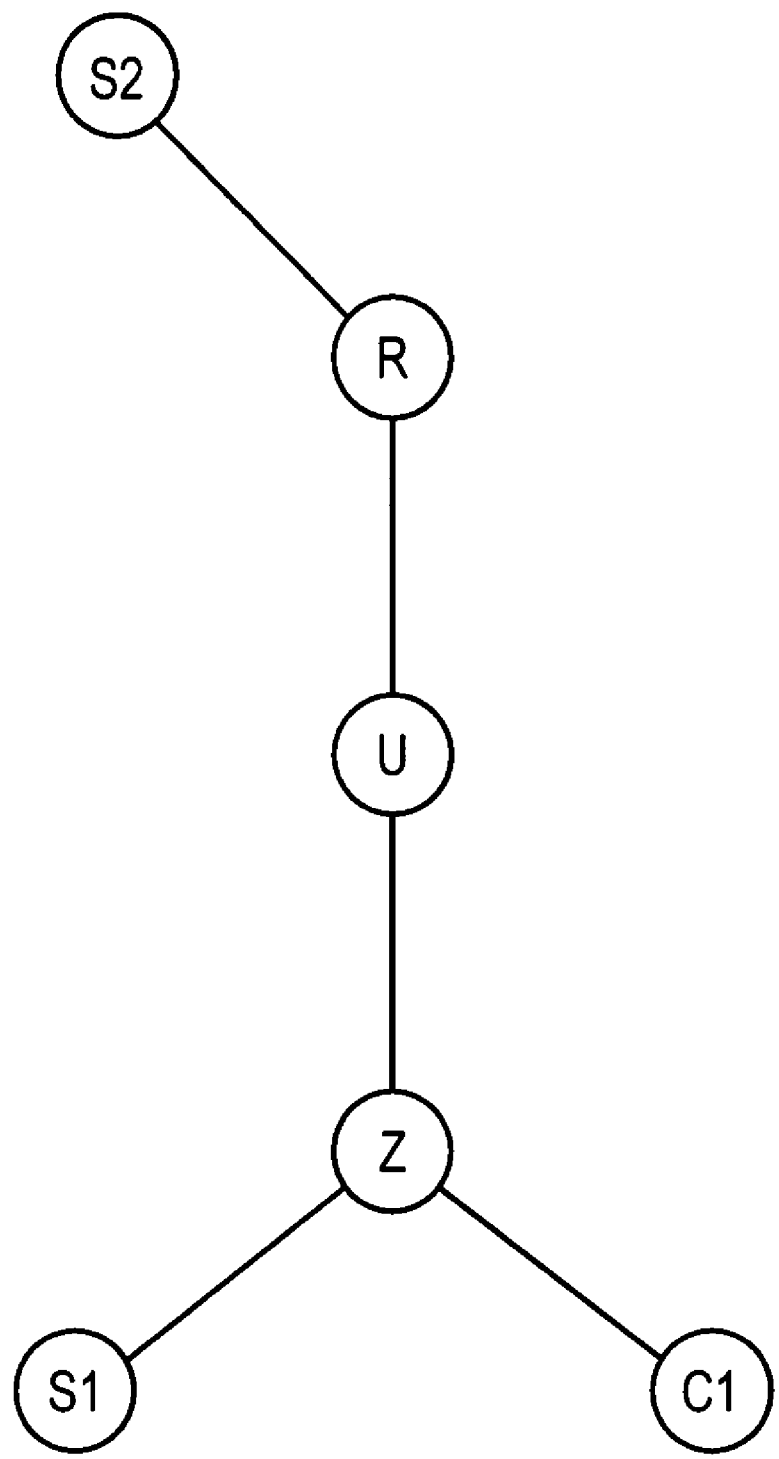
FIGS. 4A-4H illustrate example steps taken in the construction of an HD-MP2MP distribution tree.

FIGS. 4A-4H illustrate example steps taken in the construction of the label states for a HD-MP2MP distribution tree. FIG. 4A shows an initial configuration of network nodes that includes two Server leaf nodes (S1 and S2), a single Client leaf node (C1), two transit LSRs (U and Z), and a root LSR (R).

Figure 4B:
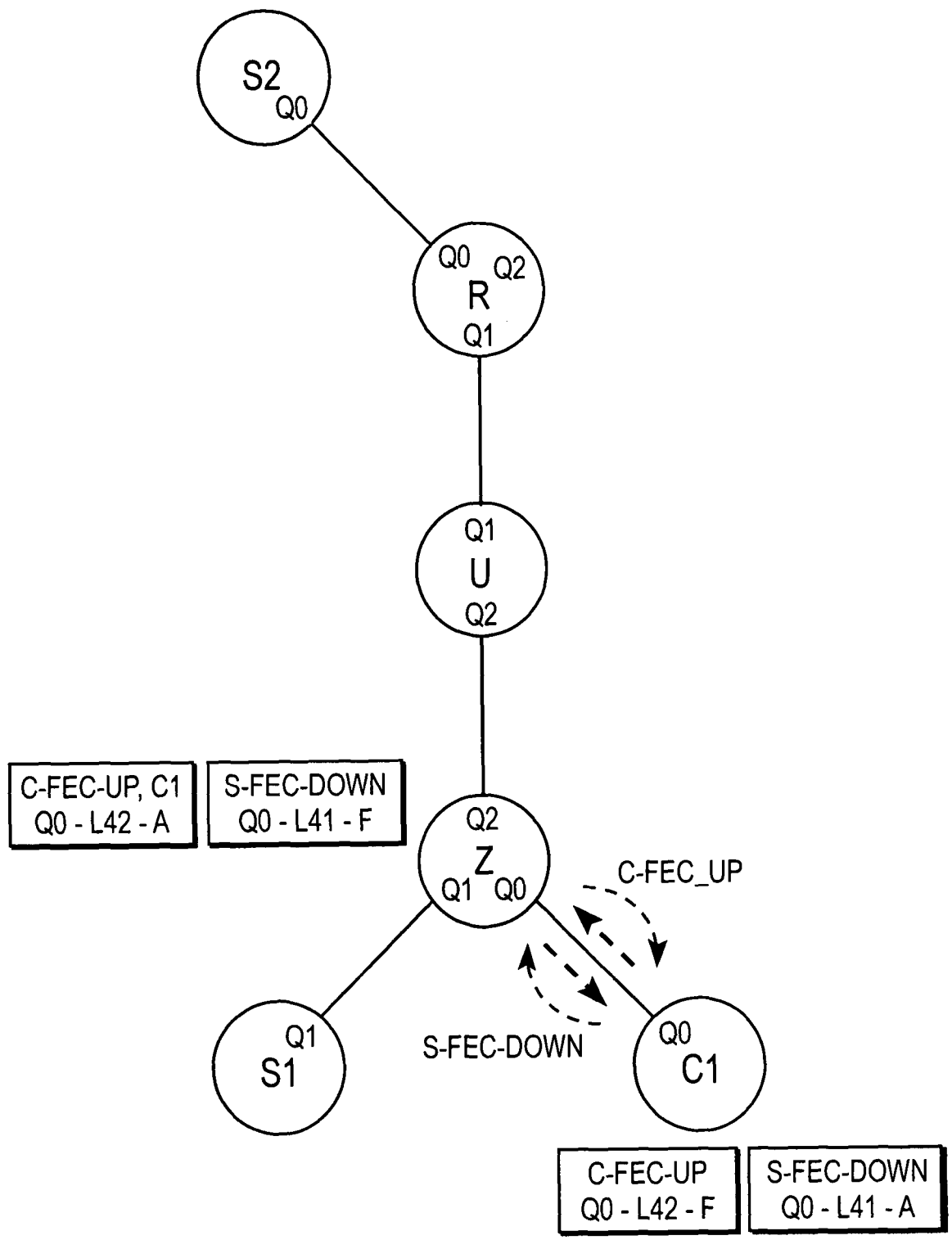

FIG. 4B shows the Join operation for the Client (C1), which begins with C1 determining its upstream neighbor Z. Client C1 then sends a downstream label map message for Server-FEC to transit node Z (S-FEC-DOWN), as shown by the curved dashed line from C1 to Z. This results in the creation of the forwarding state shown by the heavy dashed arrow from Z to C1 with the corresponding label, L41, being used for the particular label switching operation. (Note that the boxes are the forwarding state tables, with the upstream states pointing toward the root and the downstream states pointing away from the root. The various states are preserved on the individual nodes. The letter "F" in the box stands for Forward and "A" stands for Accept; hence, the S-FEC-DOWN state box shows that packets with label L41 are forwarded downstream via interface Q0, where they are then accepted at interface Q0 of C1. It is appreciated that the label state is bound to a particular interface and is assigned using the label map messages.)

Upon receipt of S-FEC-DOWN label map, transit node Z replies with an upstream label map message for Client-FEC to C1 (C-FEC-UP). This is shown in FIG. 4B by the curved dashed line from Z to C1. This creates the forwarding state shown by the heavy dashed arrow from C1 to Z with the corresponding label, L42. In this manner, Z and C1 create forwarding state for the corresponding label mappings.

Figure 4C:
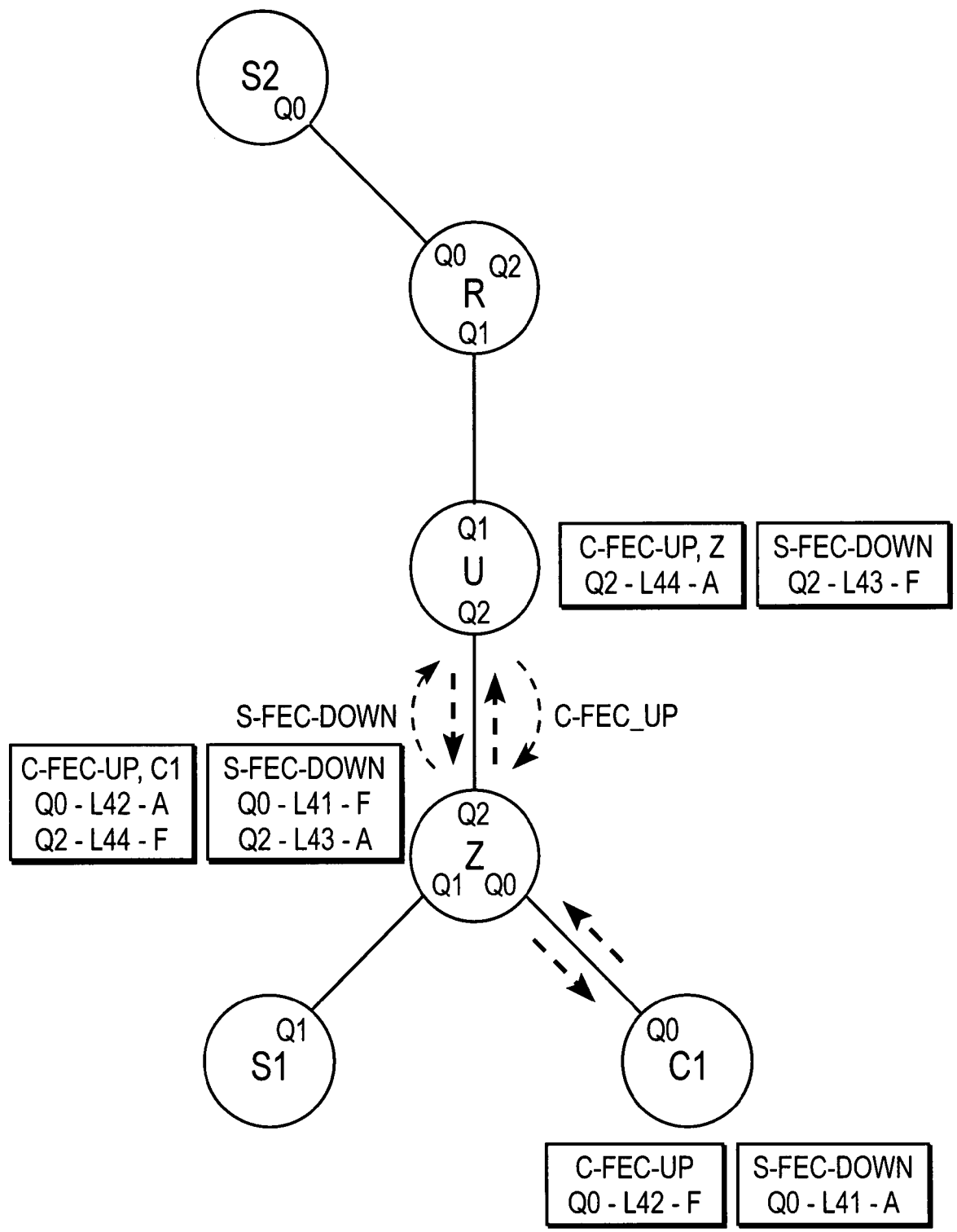
Figure 4D:
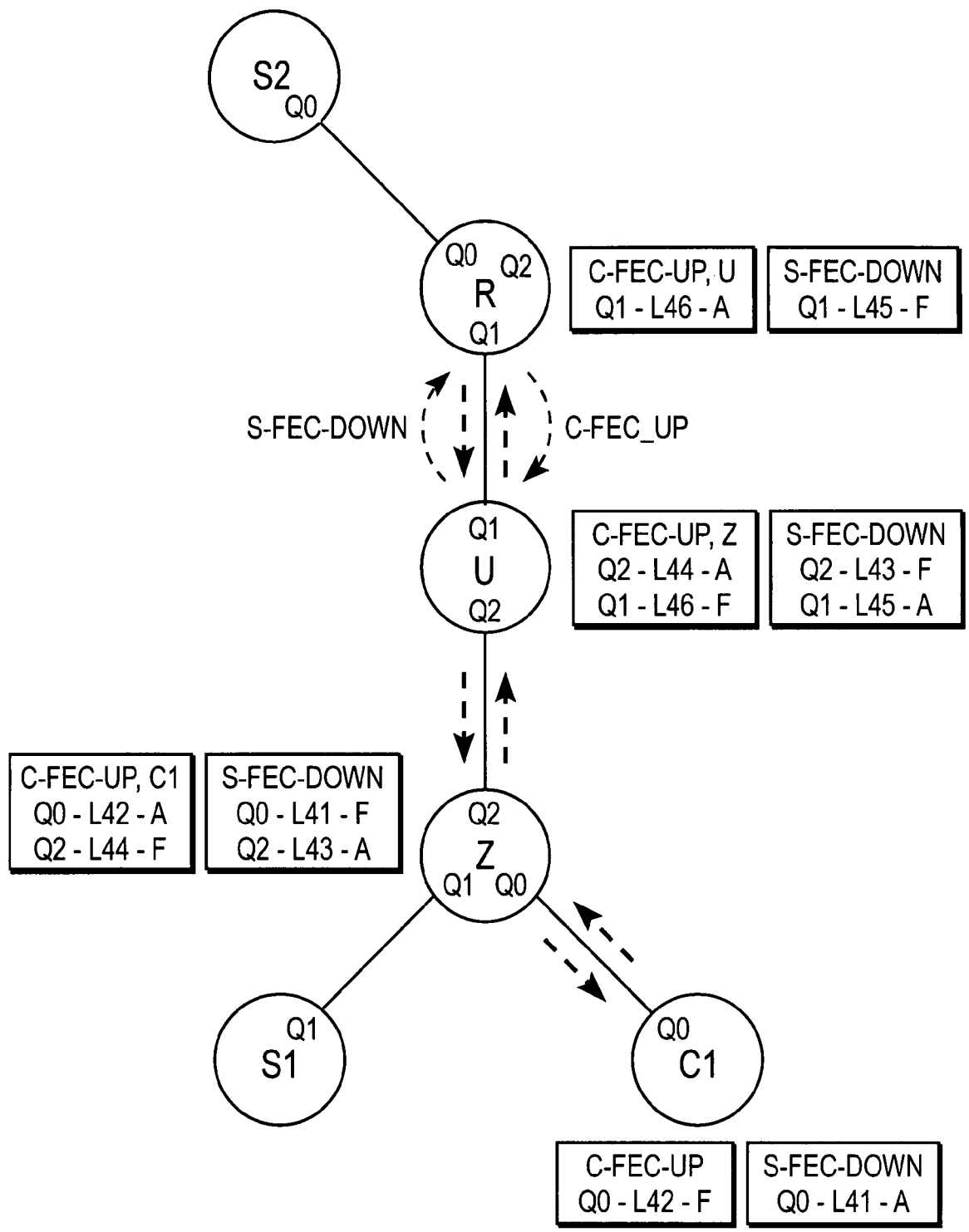

Since node Z does not have any forwarding state toward the root, it propagates the Join operation further toward the root, which operation is shown in FIG. 4C. The same basic operations that node C1 carried out with node Z is now performed by node Z toward transit node U. The steps involved include the initial step of node Z determining its upstream neighbor U. Node Z then checks whether it has forwarding state for S-FEC downstream, which, in this case, is non-existent. Node Z, therefore, sends a downstream label map for Server-FEC to U (S-FEC-DOWN), as shown by the curved arrow from Z to U. Upon receipt of S-FEC-DOWN label map, node U sends an upstream label map for Client-FEC (C-FEC-UP) to node Z. Node Z then carries out the exact same operations described above toward the root to create forwarding state for the corresponding label mappings as between nodes U and R. Creation of the forwarding state as between nodes U and R is illustrated in FIG. 4D.

Figure 4E:
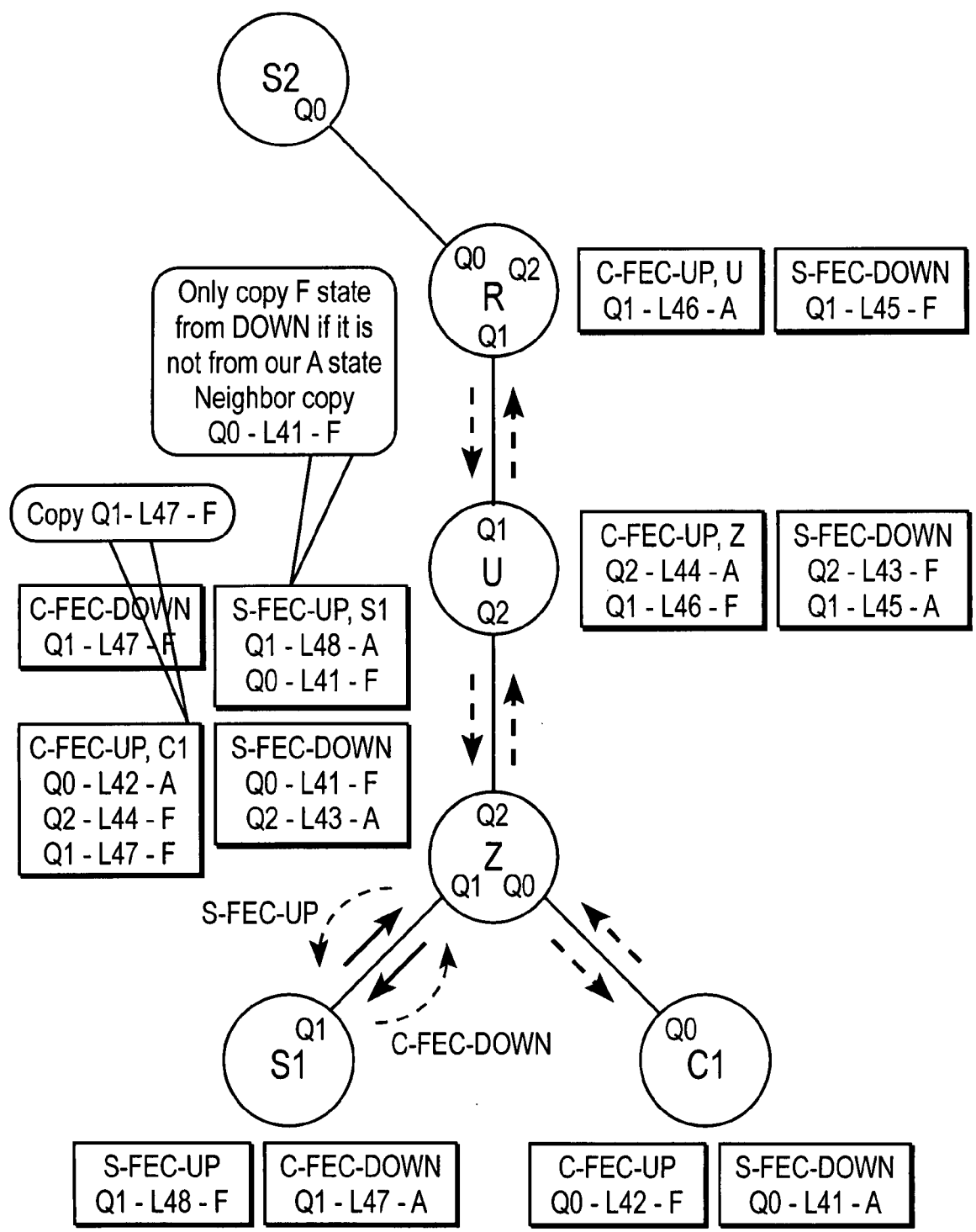

FIG. 4E illustrates the Join operation for Server S1. First, Server S1 determines its upstream neighbor, node Z. S1 then sends a downstream label map message for Client-FEC to node Z (C-FEC-DOWN). This is shown in FIG. 4E by the curved dashed lines from S1 to Z. Upon receipt of the C-FEC-DOWN label map, node Z sends an upstream label map message for Server-FEC (S-FEC-UP) to S1. At this point, the merging rules previously discussed for ensuring that traffic is sent directly from servers to clients are applied. This means, for instance, that traffic received from interface Q1 with label L48 is to be forwarded to interface Q0 with label L41 forwarding. In other words, traffic that is arriving from S1 (via the arrow from S1 to Z) is forwarded down to C1 (via the dashed arrow from Z to C1). Since Z is an intermediate LSR and has S-FEC-UP, it copies the outgoing replication information to S1 from S-FEC-DOWN towards C1 (i.e., Q0-L41-F). As a result, traffic that is accepted at Z over interface Q1 from S1 (L48) is also forwarded directly toward C1 (L41) over interface Q0.

In addition, node Z also has C-FEC-UP so it copies the outgoing replication information to S1 from C-FEC-DOWN (i.e., Q1-L47-F). This ensures that traffic arriving at node Z from C1 at interface Q0 gets forwarded northbound toward U via interface Q2 and also down the path L47 toward S1 over interface Q1. In this manner Client traffic is sent directly to the Servers, obviating paths up to the root node and back down again.

Figure 4F:
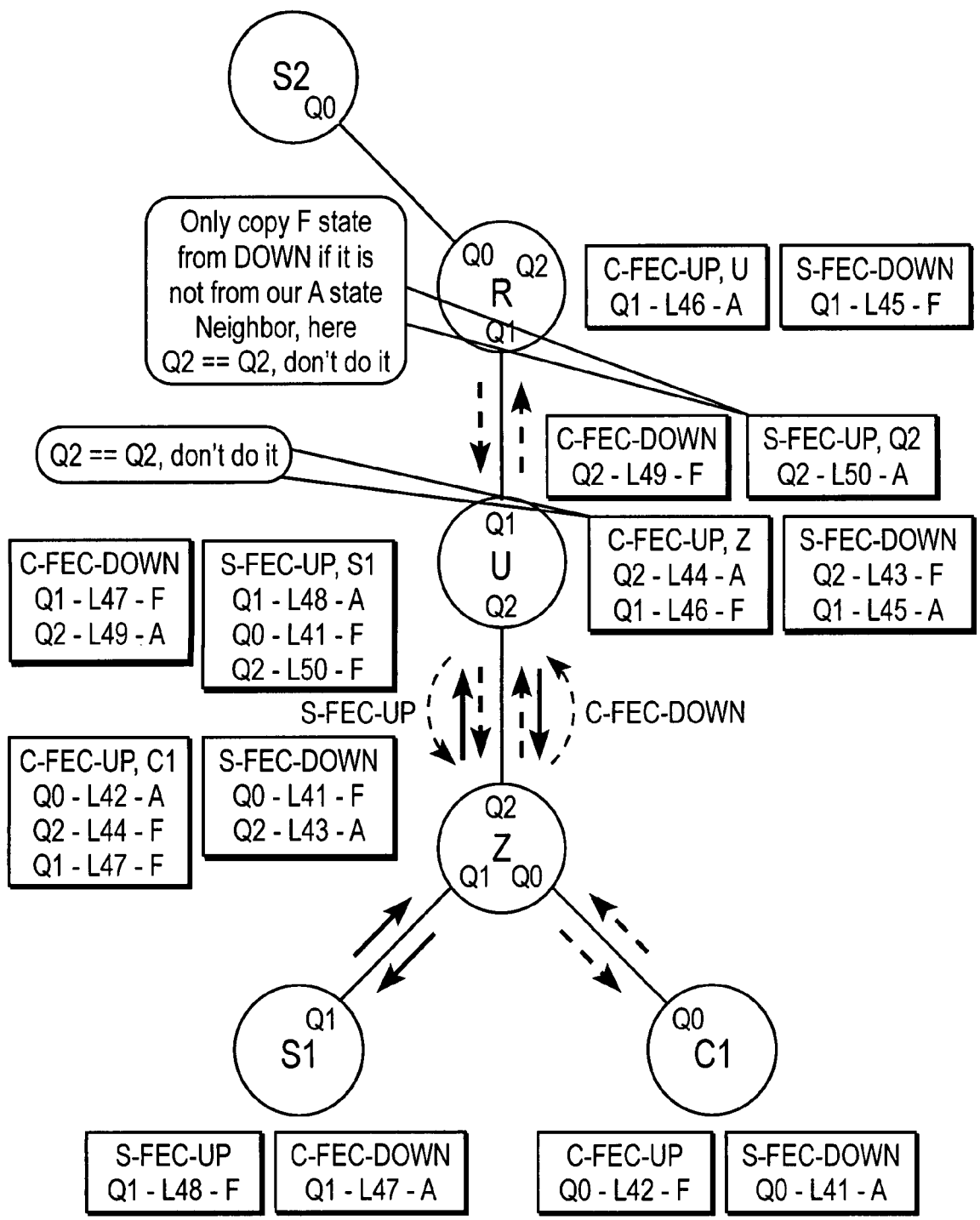

FIG. 4F illustrates the Server (S1) Join operation propagating towards the root node R via transit node U. In this example, transit nodes U and Z create forwarding state for the corresponding label mappings in the same manner as described above. Whereas in FIG. 4E, state was copied so that data packets could be forwarded in a more direct manner, in FIG. 4F no such copying is required. The reason why is because there are no branches off of node U; that is, the upstream and downstream traffic is accepted and forwarded over the same respective interfaces. Recall that the merge rules previously discussed in connection with FIG. 3 call for copying the forwarding state only if it is not over the same interface that the state was received from.

Figure 4G:
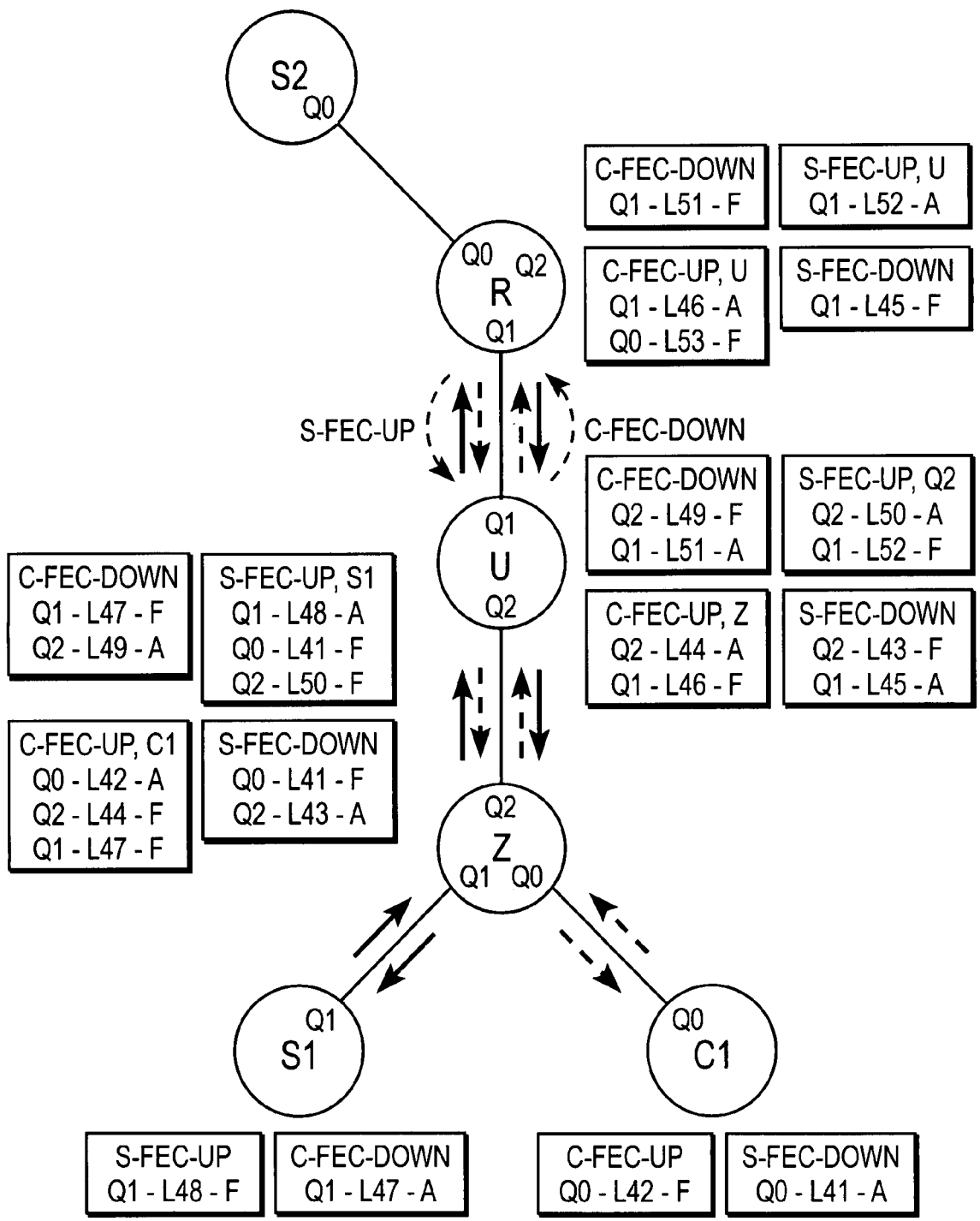

FIG. 4G illustrates the final steps in the Server Join operation as between transit node U and root node R. In this case, U first determines its downstream neighbor, which is root node R. Node U then checks whether it has forwarding state for C-FEC downstream, which, in this case is non-existent. Consequently, U sends a downstream label map message for Client-FEC to R (C-FEC-DOWN). Upon receipt of C-FEC-DOWN label map, R sends an upstream label map message for Server-FEC to U (S-FEC-UP). Thus, R and U create forwarding state for the corresponding label mappings.

Figure 4H:
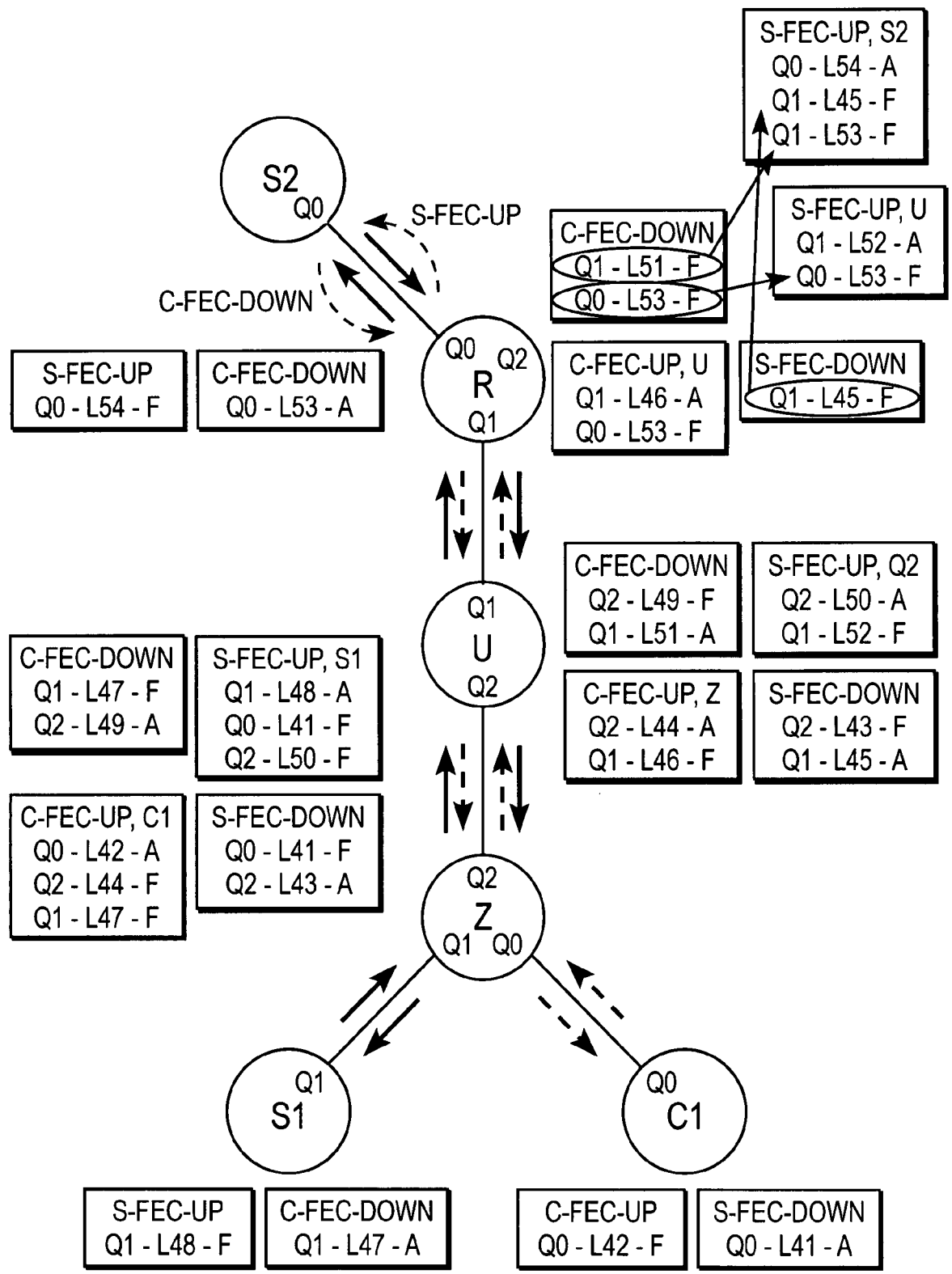

FIG. 4H illustrates the Join operation for Server S2. Here, Server S2 begins by sending a downstream label map message for Client-FEC to R (C-FEC-DOWN). On receipt of the C-FEC-DOWN label map, R sends an upstream a label map for Server-FEC (S-FEC-UP) to S2. Since R is the root LSR and has S-FEC-UP, it copies the outgoing replication information from S-FEC-DOWN in order to make it so all Clients receive Server traffic from S2. This is shown in the example of FIG. 4H by the copying of Q0-L45-F from S-FEC-DOWN table into the S-FEC-UP, S2 table. Similarly, R also copies replication information from C-FEC-DOWN into S-FEC-UP to ensure that Servers receive Server traffic sent from S2. This is shown by the copying of Q0-L53-F and Q1-L51-F from C-FEC-DOWN table into the respective S-FEC-UP, U and S-FEC-UP, S2 tables.

Figure 5:
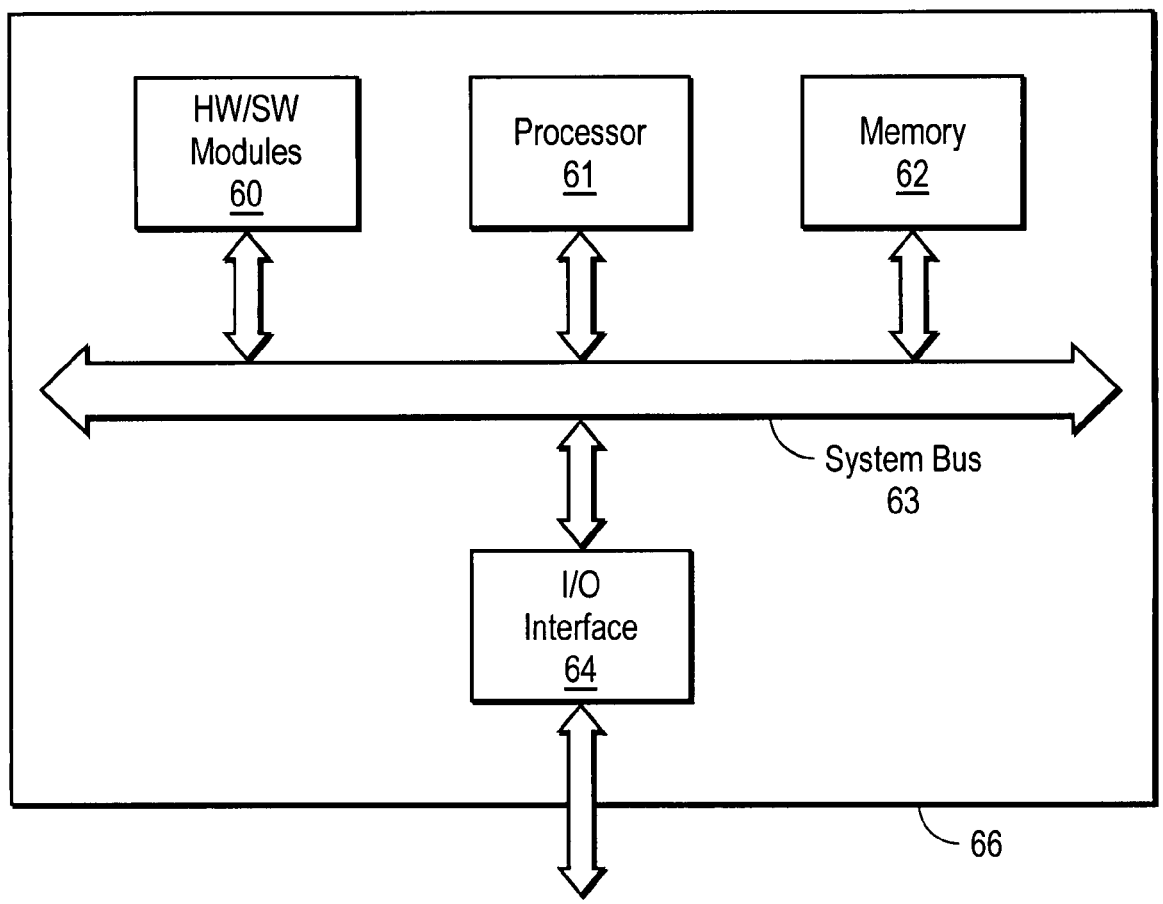
FIG. 5 illustrates an example network device or node.

FIG. 5 illustrates an example network device or node 66, such as may comprise any of the devices or nodes (e.g., a LSR) described above. Node 66 comprises a number of basic subsystems including a processor subsystem 61, a main memory 62, one or more hardware/software modules 60, and an input/output (I/O) interface or subsystem 64. Each of these subsystems are coupled together via a system bus 63. Examples of the system bus may include the conventional lightning data transport (or hyper transport) bus and the conventional peripheral component [computer] interconnect (PCI) bus. Modules 60 may include software, firmware, or logic embedded in hardware for implementing any of the functions described herein, e.g., those functions associated with the building of the distribution tree, creation of label states, join creation of the Client and Server trees upstream and downstream, replication of label state information, etc. Node 66 may also comprise other hardware units/modules 60 coupled to system bus 63 for performing additional functions. Processor subsystem 61 may comprise one or more processors and a controller device that incorporates a set of functions including a system memory controller, support for one or more system buses and direct memory access (DMA) engines.

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

We claim:
1. A method comprising:
constructing a Half-Duplex Multipoint Distribution Tree (HD-MDT) for transport of packets from a plurality of servers of a broadcast content provider to a plurality of client devices of a Service Provider network such that each of the servers are operable to forward packets to all of the client devices and to other ones of the servers, and each of the client devices are operable to forward data packets to the servers, but none of the client devices are operable to forward data packets to any other one of the client devices, the constructing comprising:

sending upstream to a nearest neighbor node, by a Client Label Switched Router (LSR), a downstream label map message of a Server-Forwarding Equivalence Class type (S-FEC-DOWN), in response, a downstream forwarding state from the nearest neighbor node to the Client LSR being established;

receiving an upstream label map message of a Client-Forwarding Equivalence Class type (C-FEC UP) from the nearest neighbor node; and establishing, by the Client LSR, an upstream forwarding state corresponding to the C-FEC UP.

2. The method of claim 1 wherein the Client LSR comprises a leaf LSR of a Multi-Protocol Label Switching (MPLS) network.

3. The method of claim 1 wherein the Client LSR comprises a leaf LSR of a Half-Duplex Multipoint-to-Multipoint (HD-MP2MP) Label Switched Path (LSP) that includes a single root node.

4. The method of claim 1 wherein the nearest neighbor node comprises a transit node of a Multi-Protocol Label Switching (MPLS) network.

5. The method of claim 1 wherein the downstream forwarding state from the nearest neighbor node to the Client LSR is established by the nearest neighbor node.

6. A method comprising:
constructing a Half-Duplex Multipoint Distribution Tree (HD-MDT) for transport of packets from a plurality of servers of a broadcast content provider to a plurality of client devices of a Service Provider network such that each of the servers are operable to forward packets to all of the client devices and to other ones of the servers, and each of the client devices are operable to forward data packets to the servers, but none of the client devices are operable to forward data packets to any other one of the client devices, the constructing comprising:

sending upstream to a nearest neighbor node, by a Server Label Switched Router (LSR), a downstream label map message of a Client-Forwarding Equivalence Class type (C-FEC-DOWN), in response, a downstream forwarding state from the nearest neighbor node to the Server LSR being established by the nearest neighbor node;

receiving an upstream label map message of a Server-Forwarding Equivalence Class type (S-FEC UP) from the nearest neighbor node; and establishing, by the Server LSR, an upstream forwarding state corresponding to the S-FEC UP.

7. The method of claim 6 wherein the Server LSR comprises a leaf LSR of a Multi-Protocol Label Switching (MPLS) network.

8. The method of claim 6 wherein the Server LSR comprises a leaf LSR of a Half-Duplex Multipoint-to-Multipoint (HD-MP2MP) Label Switched Path (LSP) that includes a single root node.

9. The method of claim 6 wherein the nearest neighbor node comprises a transit node of a Multi-Protocol Label Switching (MPLS) network.

10. The method of claim 6 wherein the downstream forwarding state from the nearest neighbor node to the Server LSR is established by the nearest neighbor node.

11. A method comprising:
constructing a Half-Duplex Multipoint Distribution Tree (HD-MDT) for transport of packets from a plurality of servers of a broadcast content provider to a plurality of client devices of a Service Provider network such that each of the servers are operable to forward packets to all of the client devices and to other ones of the servers, and each of the client devices are operable to forward data packets to the servers, but none of the client devices are operable to forward data packets to any other one of the client devices, the constructing comprising:

responsive to receiving a downstream label map message of a Client-Forwarding Equivalence Class type (C-FEC DOWN) from a Server, sending an upstream label map message of a Server-Forwarding Equivalence Class type (S-FEC UP) to the Server; and responsive to receiving an downstream label map message of a Server-Forwarding Equivalence Class type (S-FEC DOWN) from a Client, sending an upstream label map message of a Client-Forwarding Equivalence Class type (C-FEC UP) to the Client.

12. The method of claim 11 further comprising copying outgoing replication information to the Server corresponding to the S-FEC-DOWN such that subsequent data packet traffic accepted at a first interface from the Server is forwarded directly toward the Client over a second interface.

13. The method of claim 12 further comprising copying outgoing replication information to the Server corresponding to the C-FEC-DOWN such that subsequent data packet traffic accepted at the second interface from the Client is forwarded toward a root node via a third interface and also toward the Server over the first interface.

14. An apparatus comprising:
one or more processors; and
a memory comprising one or more instructions executable at the processors for constructing a Half-Duplex Multipoint Distribution Tree (HD-MDT) for transport of packets from one or more servers of a broadcast content provider to a plurality of client devices of a Service Provider network such that each of the one or more servers are operable to forward packets to all of the client devices and to other ones of the servers, and each of the client devices are operable to forward data packets to the one or more servers, but none of the client devices are operable to forward data packets to any other one of the client devices, the one or more processors being operable, when executing the instructions, to:

receive a downstream label map message of a Client-Forwarding Equivalence Class type (C-FEC DOWN) from a Server of a Multi-Protocol Label Switching (MPLS) network; and send an upstream label map message of a Server-Forwarding Equivalence Class type (S-FEC UP) to the Server responsive to the C-FEC DOWN.

15. The apparatus of claim 14 wherein the one or more processors are further operable, when executing the instructions, to receive a downstream label map message of a Server-Forwarding Equivalence Class type (S-FEC DOWN) from a Client of the MPLS network.

16. The apparatus of claim 15 wherein the one or more processors are further operable, when executing the instructions, to send an upstream label map message of a Client-Forwarding Equivalence Class type (C-FEC UP) to the Client responsive to the S-FEC DOWN.

17. The apparatus of claim 14 further comprising first and second interfaces, and wherein the one or more processors are further operable, when executing the instructions, to copy outgoing replication information to the Server corresponding to the S-FEC-DOWN such that subsequent data packet traffic accepted at the first interface from the Server is forwarded directly toward the Client over the second interface.

18. The apparatus of claim 17 further comprising a third interface, and Wherein the one or more processors are further operable, when executing the instructions, to copy outgoing replication information to the Server corresponding to the C-FEC-DOWN such that subsequent data packet traffic accepted at the second interface from the Client is forwarded toward a root node via a third interface and also toward the Server over the first interface.

19. The apparatus of claim 15 wherein the Client comprises a leaf Label Switched Router (LSR) of a Half-Duplex Multipoint-to-Multipoint (HD-MP2MP) Label Switched Path (LSP) that includes a single root node.

20. A method comprising:
  automatically constructing a Half-Duplex Multipoint Distribution Tree (HD-MDT) for transport of video packets from a plurality of servers of a broadcast content provider to a plurality of client devices of a Service Provider network such that each of the servers are operable to forward video packets to all of the client devices and to other ones of the servers, and each of the client devices are operable to forward data packets to the servers, but none of the client devices are operable to forward data packets to any other one of the client devices, the constructing including:
  receiving, by a node of the HD-MDT, a downstream label map message of a Client-Forwarding Equivalence Class type (C-FEC DOWN) from a first one of the servers; and
  sending, by the node, an upstream label map message of a Server-Forwarding Equivalence Class type (S-FEC UP) to the first one of the servers responsive to the C-FEC DOWN.

21. The method of claim 20 wherein the constructing further comprises:
  receiving, by a second node of the HD-MDT, a downstream label map message of a Server-Forwarding Equivalence Class type (S-FEC DOWN) from a first one of the client devices; and
  sending, by the second node, an upstream label map message of a Client-Forwarding Equivalence Class type (C-FEC UP) to the first one of the client devices responsive to the S-FEC DOWN.

22. The method of claim 20 wherein the client devices comprise Digital Subscriber Line Access Multiplexers (DSLAMs).

23. The method of claim 20 wherein the client devices comprise Cable Modem Termination System (CMTS) components.

* * * * *